US012498045B1

(12) United States Patent
Brous

(10) Patent No.: US 12,498,045 B1
(45) Date of Patent: Dec. 16, 2025

(54) IRRIGATION VALVE ASSEMBLY REPLACEMENT METHOD AND SYSTEM

(71) Applicant: Noah Brous, Plano, TX (US)

(72) Inventor: Noah Brous, Plano, TX (US)

(*) Notice: Subject to any disclaimer, the term of this patent is extended or adjusted under 35 U.S.C. 154(b) by 0 days.

(21) Appl. No.: 18/894,524

(22) Filed: Sep. 24, 2024

(51) Int. Cl.
*E03B 1/04* (2006.01)
*F16K 1/36* (2006.01)
*F16L 15/08* (2006.01)

(52) U.S. Cl.
CPC .............. *F16K 1/36* (2013.01); *F16L 15/08* (2013.01)

(58) Field of Classification Search
CPC ..... F16K 1/36; F16L 15/08; F16L 9/22; F16L 13/103; F16L 19/0218; F16L 19/028; F16L 19/0286; F16L 21/002; F16L 25/009; F16L 49/02
See application file for complete search history.

(56) References Cited

U.S. PATENT DOCUMENTS

2013/0008542 A1* 1/2013 Irwin .................... F16K 37/005
137/859

* cited by examiner

*Primary Examiner* — Jun S Yoo
(74) *Attorney, Agent, or Firm* — Law Office of Sam Sokhansanj PLLC

(57) ABSTRACT

A quick, easy, and cost-effective method and system for manufacturing and replacing solenoid valves of a sprinkler assembly is disclosed without the need to perform additional digging and can be performed with the use of simple tools, among other advantages. The method can include assembling a solenoid valve assembly, the method comprising, severing a riser pipe into a first member, wherein the first member comprises a threaded male end and a non-threaded male end, and securing a non-threaded female end of a second member to the non-threaded male end of the first member via one or more adhesives. The method can further include securing a threaded male end of the second member to a threaded female end of a third member and coupling the threaded male end of the first member to a solenoid valve inlet or outlet opening.

12 Claims, 9 Drawing Sheets

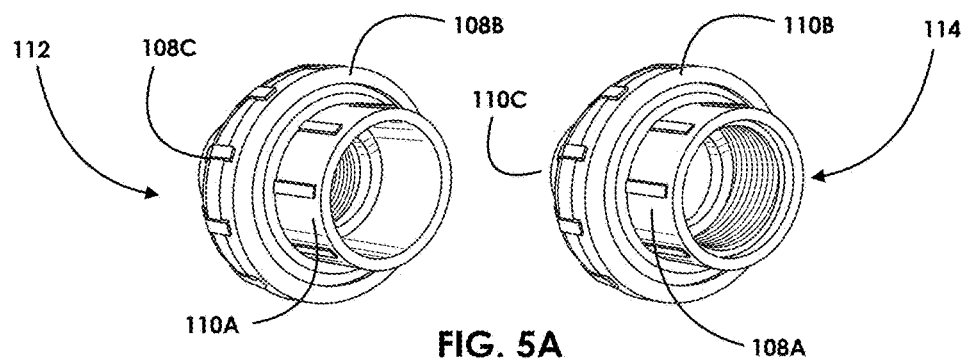
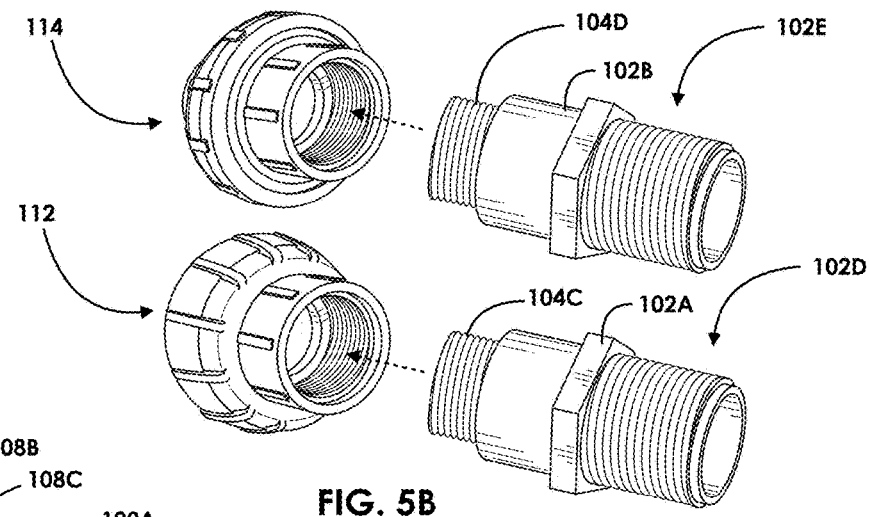
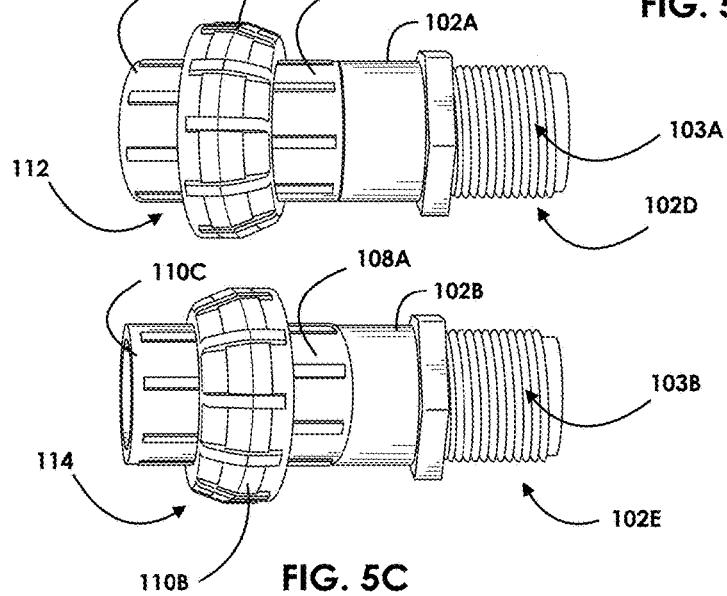
FIG. 5A
FIG. 5B
FIG. 5C

IRRIGATION VALVE ASSEMBLY REPLACEMENT METHOD AND SYSTEM

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Sprinkler systems for irrigating lawns and vegetation are well known. Typical systems include a plurality of valves and sprinkler heads in fluid communication with a water source, and a centralized controller connected to the water solenoid valves. At appropriate times the controller opens the normally closed solenoid valves to allow water to flow from the water source to the sprinkler heads to one or more designated zones. Water then issues from the sprinkler heads in predetermined fashion within the designated sprinkler zone.

It is common for the foregoing solenoid valves to malfunction, cease to operate properly, and require replacement and/or maintenance. However, there currently exists no system or method for quickly, easily, and cost-effectively replacing the foregoing solenoid valves. In particular, replacing such solenoid valves typically requires the laborious and time consuming process of 1) turning off electrical power to the defective solenoid(s); 2) electrically disconnecting the solenoid(s) from the irrigation system; 3) digging up the solenoid(s) and surrounding area from the ground; 4) cutting pipes in appropriate locations to remove defective solenoid(s); 5) rebuilding the missing pipe sections, including solenoid(s); 6) wiring the replacement solenoid(s) to irrigation system; 7) burry the replacement solenoid(s) into the ground; and 8) return the lawn/turf to cover the solenoids, if salvageable; and 9) turning back on electrical power to the replacement solenoid(s), among other laborious steps. In addition, in most cases, the entire main water supply system (such as from the city/municipality) to the solenoid valves needs to also be shut off in order to consummate the repair and replacement of the solenoids.

Hence, what is needed is a quick, easy, and cost-effective method and system for manufacturing and replacing solenoid valves of a sprinkler assembly without the need to perform additional digging and can be performed with the use of simple tools, among others.

BRIEF SUMMARY

In one aspect of the disclosure described herein, a quick, easy, and cost-effective method and system for manufacturing and replacing solenoid valves of a sprinkler assembly is disclosed without the need to perform additional digging and can be performed with the use of simple tools, among other advantages. The method can include assembling a solenoid valve assembly, the method comprising, severing a riser pipe into a first member, wherein the first member comprises a threaded male end and a non-threaded male end, and securing a non-threaded female end of a second member to the non-threaded male end of the first member via one or more adhesives. The method can further include securing a threaded male end of the first member to a threaded female end of a third member, and coupling a threaded male end of the second member to a solenoid valve inlet or outlet opening.

In addition, the method may include securing a threaded ring member to the exterior of the third member.

Further, the method may include securing a fourth member to the third member via the threaded ring member.

Also, the one or more adhesives may be at least PVC cement.

Moreover, the second member may further include a non-threaded exterior end.

In addition, coupling a first shut-off valve to the third member, wherein the first, second, and third members are disposed between the solenoid valve and the first shut-off valve.

Also, the method may include severing the riser pipe into a fifth member, wherein the fifth member comprises a threaded male end and a non-threaded male end, securing a non-threaded female end of a sixth member to the non-threaded male end of the first member via one or more adhesives, securing a threaded male end of the fifth member to a threaded female end of a seventh member, and coupling a threaded male end of the sixth member to the solenoid valve inlet or outlet opening.

Further, the method may include coupling a second shut-off valve to the seventh member, wherein the fifth, sixth, and seventh members are disposed between the solenoid valve and the second shut-off valve.

In addition, the method may include measuring about one-inch distance from a base of the threaded end of the riser pipe, marking the about one-inch distance on the riser pipe, and severing the riser pipe at the marked about one-inch distance into the first member.

Further, the method may include connecting the third member to one or more piping of a sprinkler or irrigation assembly.

Also, the method may include digging a control access area into the earth and placing the assembled solenoid valve, first, second, and third members inside the control access area.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 5A illustrates perspective views of the re-arranged members of the female and slip union in assembled form, according to one non-limiting exemplary embodiment.

FIG. 5B illustrates perspective views of the re-arranged members of the female and slip union and perspective views of the assembled male adapters and severed riser members, shown disassembled, according to one non-limiting exemplary embodiment of the disclosure described herein.

FIG. 5C illustrates side views of the re-arranged members of the female and slip unions and perspective views of the assembled male adapters and severed riser members, shown secured to each other in assembled form, according to one non-limiting exemplary embodiment of the disclosure described herein.

DETAILED DESCRIPTION

Figure 1A:
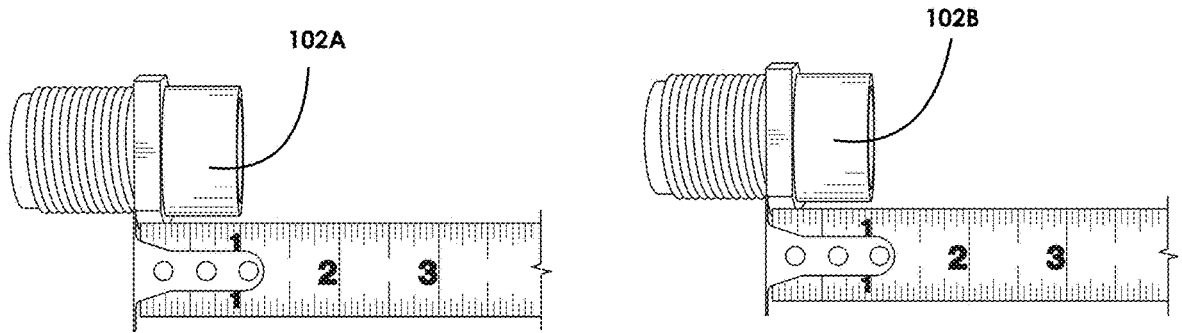
FIG. 1A illustrates side views of two slip and male adapter, according to one non-limiting exemplary embodiment of the disclosure described herein.
Figure 1B:
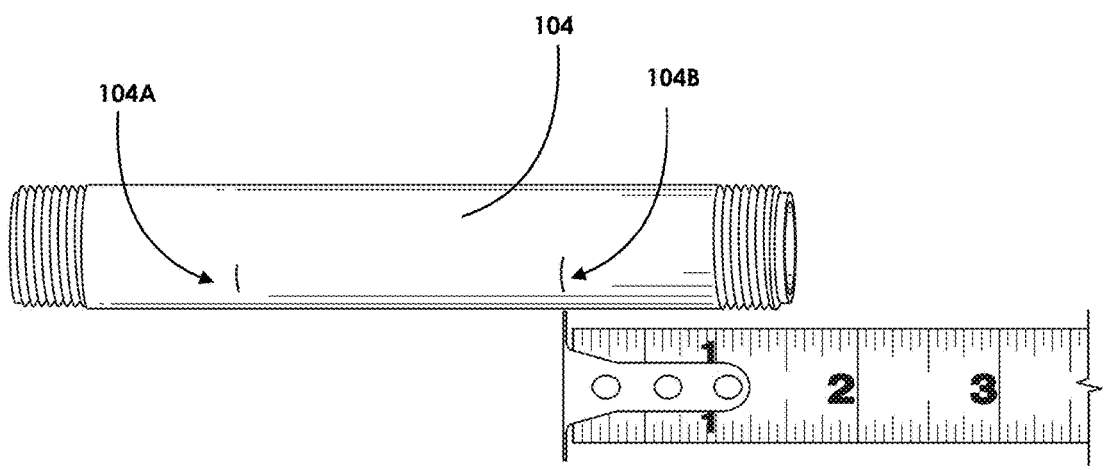
FIG. 1B illustrates a side view of a threaded riser, according to one non-limiting exemplary embodiment according to the disclosure described herein.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

In general, the sprinkler assembly solenoid valve replacement method and system of the disclosure described herein can include at least the following main components, namely: Two unions that contain one slip end and one female end, whereby a union can be on either end of the solenoid thereby enabling the use of pliers (such as channel lock pliers) to remove the section of piping which contains the solenoid valve; two union solenoid connections, whereby this section can vary depending on the size of the inlet/outlet of the solenoid valve and the rest of the sprinkler piping assembly; and a replacement solenoid valve, which can be any type of standard solenoid valve and wherein the parts associated with the solenoid can be adjusted accordingly based the solenoid's inlets/outlets and rest of the sprinkler piping assembly. The disclosure described herein is not limited to irrigation systems, but any type of piping that may require replacement of one or more solenoid valves.

In addition, in at least one embodiment, the following tools, among others, can be used to make, use, and perform the sprinkler assembly solenoid valve replacement method and system of the disclosure described herein, namely: 1) two pairs of channel lock pliers large enough to use on the pipe's outer diameter; 2) a device to cut the pipe the user intends on using; 3) a tape measure or ruler (or any length measuring device) having a minimum 10' measuring distance; 4) a pen or marking apparatus for marking measurements; 5) a facility appropriate Personal Protective Equipment (PPE). However, it is contemplated within the scope of the present disclosure described herein that any other types of tools may be used depending on the desired application.

Further, in at least one embodiment, the following materials can be used to at least make, use, and perform the sprinkler assembly solenoid valve replacement method and system of the disclosure described herein, namely: 1) one or more solenoid valves; 2) at least two male adapter members for piping; 3) at least one riser member for piping; 4) at least one slip joint union member for piping; 5) at least one female union member for piping; 6) at least one ball valve member for piping; 7) PVC cement and primer or welding/adhesive materials; 8) plumber's tape; and 9) piping, among others. Here, the diameter of each of the foregoing materials can be adjusted to fit the needs of each sprinkler system. For example, the male adapter member's diameter can vary depending on the application and assembly of the system. However, it is contemplated within the scope of the present disclosure described herein that any other types of materials and components may be used depending on the desired application.

FIGS. 1A-9 illustrate one or more non-limiting exemplary embodiments with respect to a method and system of manufacturing, assembling, replacing, and operating a sprinkler assembly solenoid valve of the disclosure described herein. In one embodiment, the process can begin at FIG. 1A. FIG. 1A illustrates ¾" male adapter members 102A and 102B having both a threaded male end and a slip male and female end (i.e., smooth/non-threaded). Here, each of members 102A and 102B include a hexagonal nut configuration. Using a tape measure, the user can measure the depth or length of the slip end, which for this example, is about one-inch. However, it is contemplated within the scope of the present disclosure described herein that the slip end can be of any depth and the male adapter can be of any diameter or size. FIG. 1B illustrates a male riser pipe member 104 having threaded ends on both opposing ends. Here, the user can measure the one-inch determined from the slip end of the male adapters starting from the base of the threads on each end and moving to the unthreaded section of the riser 104. Once the one-inch is determined, the user can then mark that area as 104A and 104B, as shown in FIG. 1B.

Figure 2A:
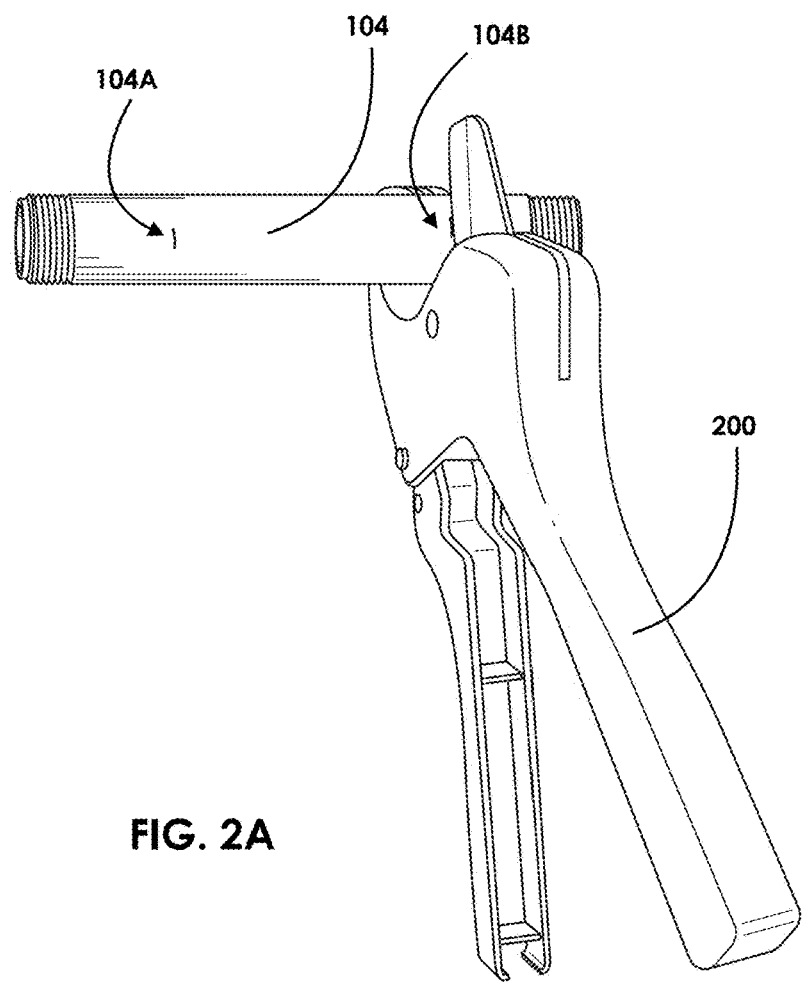
FIG. 2A illustrates a perspective view of a pipe cutter and the riser, according to one non-limiting exemplary embodiment of the disclosure described herein.
Figure 2B:
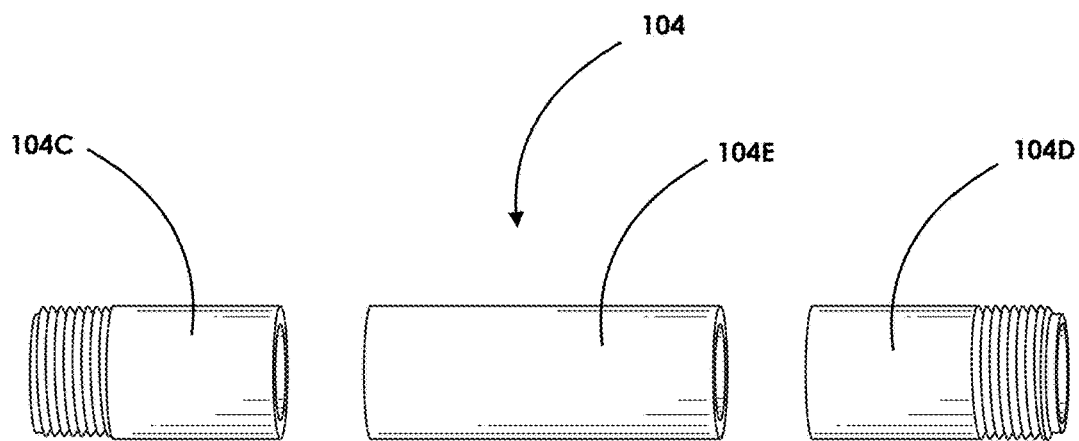
FIG. 2B illustrates a side view of the riser of FIG. 1B and FIG. 2A shown in severed into multiple pieces, according to one non-limiting exemplary embodiment of the disclosure described herein.
Figure 3A:
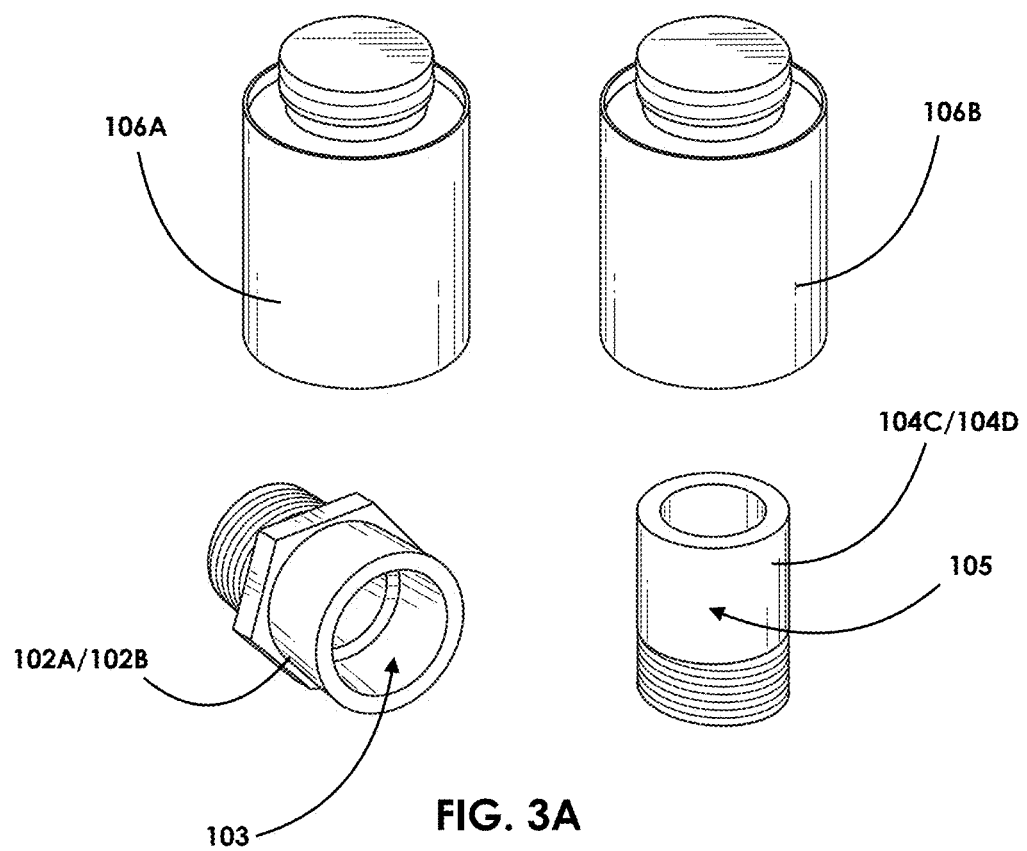
FIG. 3A illustrates perspective views of primer and cement/adhesive containers and perspective views of one of the slip and male adapters and a severed riser member, according to one non-limiting exemplary embodiment of the disclosure described herein.
Figure 3B:
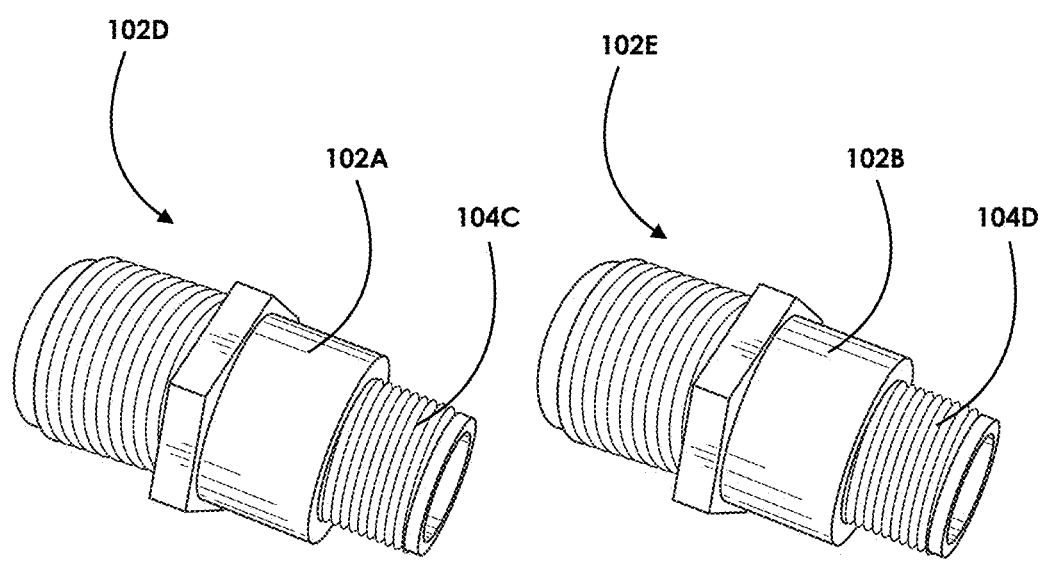
FIG. 3B illustrate perspective views of each male adapter secured to the severed riser member, according to one non-limiting exemplary embodiment of the disclosure described herein.

FIG. 2A illustrates a pipe cutter (such as a PVC pipe cutter) engaging the riser 104 at marked areas 104A and 104B in order to sever and cut the riser 104 at those marked areas. After cutting the riser 104, FIG. 2B illustrates the riser 104 severed into three independent pieces, namely, member 104C, 104E, and 104D. FIG. 3A illustrates the pipe/PVC cement 106A and primer 106B that will be used to coat the interior slip (smooth) surfaces of male adapters 102A and 102B. In particular, at this step, the user can use the piping cement 106A and primer 106B (or any adhesive or welding material) in order to coat inner slip (smooth) surface 103 of each of male adapters 102A and 102B, in addition to coating the outer slip (smooth) surface 105 of each of severed riser members 104C and 104D, as shown in FIG. 3A. FIG. 3B illustrates each of members 102A and 102B assembled and secured to corresponding severed riser members 104C and 104D, after they have been coated with adhesives on surfaces 103 and 105, thereby forming members 102D and 102E, respectively.

Figure 4A:
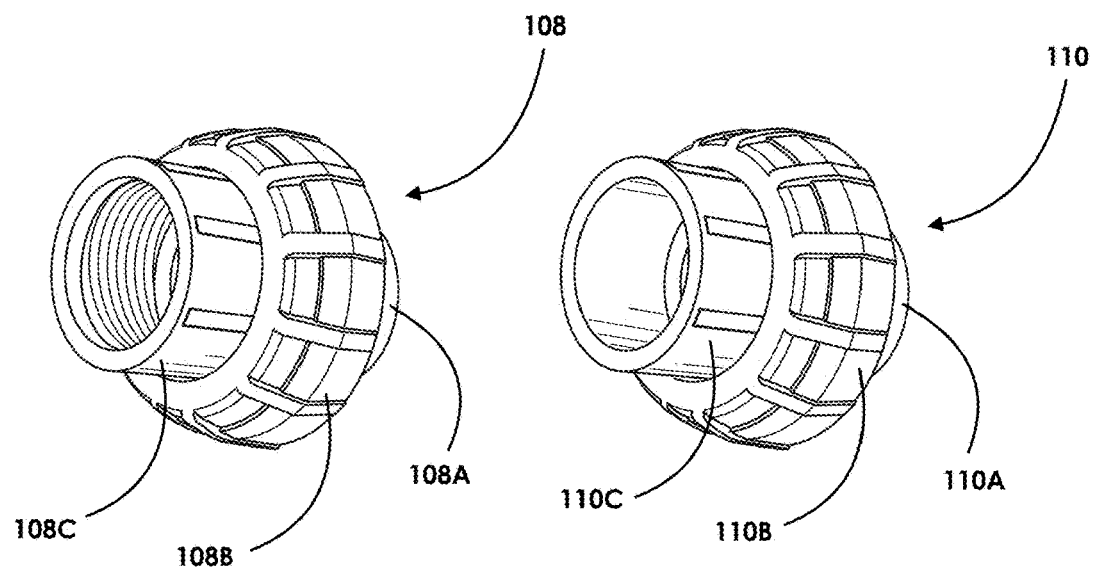
FIG. 4A illustrates perspective views of an assembled female union and slip union, according to one non-limiting exemplary embodiment of the disclosure described herein.
Figure 4B:
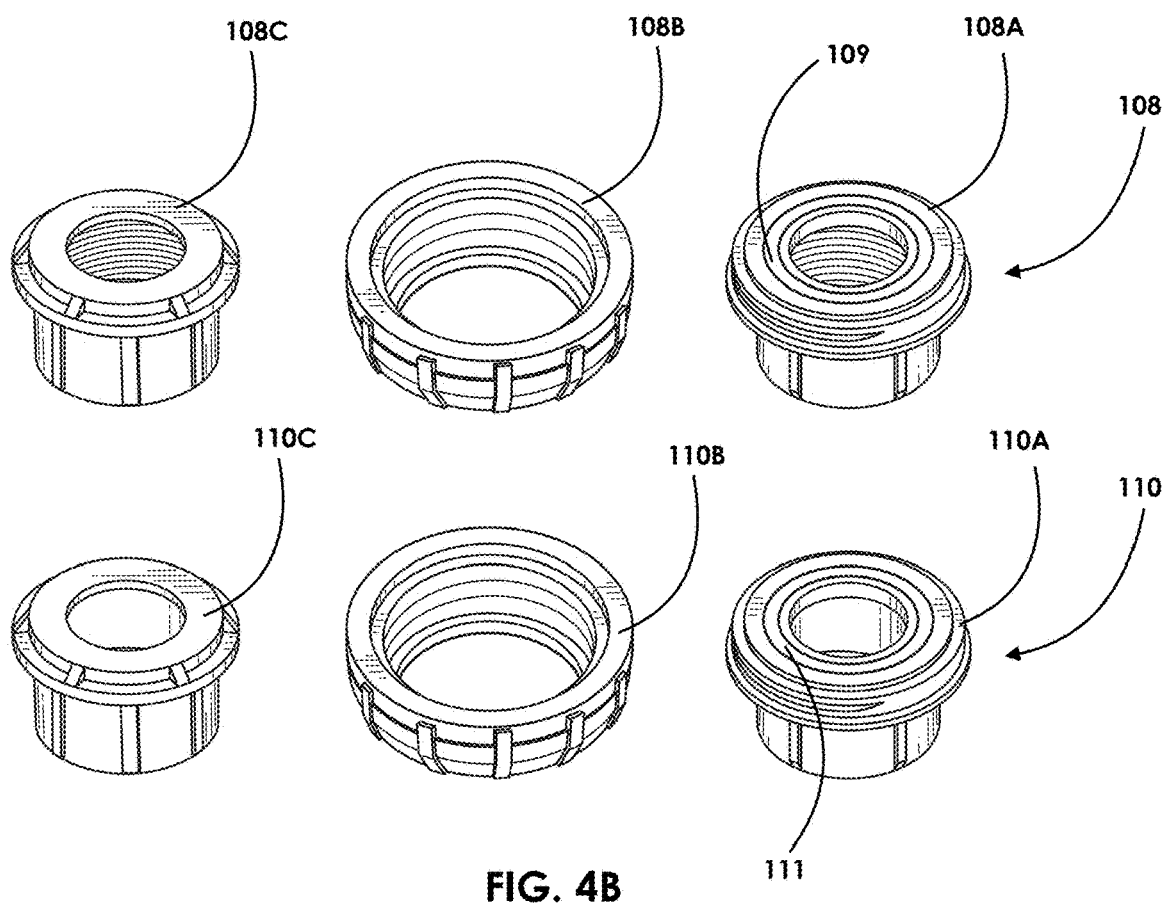
FIG. 4B illustrates perspective views of dis-assembled and re-arranged independent members of the female union and slip union, according to one non-limiting exemplary embodiment.

FIG. 4A illustrates female union member 108 and slip union member 110 in their original assembled form. Here, at FIG. 4B, the next process can include disassembling the female union member 108 and slip union member 110 in order to re-arrange and re-assemble each component of members 108 and 110. FIG. 5A illustrates the re-assembled union member 112 which includes component members 110A (from union member 110), ring member 108B (from union member 108), and component member 108C (from union member 108). In addition, re-assembled union member 114 can include component member 110C (from union member 110), component member 110B (from union member 110), and component member 108A (from union member 108). Here, each of members 108A-108C and 110A-110C can include notches, protrusions, or knurls on their exterior surfaces to assist the user with tightening or loosening of each member. FIGS. 5B-5C illustrates a method of assembling and securing members 102D and 102E to union members 112 and 114, respectively. As shown in FIG. 5C, the user may need to use pliers (such as channel lock pliers) or wrench in order to securely thread the male ends of members 102D and 102E onto the female threaded ends of members 112 and 114, respectively. For guidance, the PVC cement should squeeze out of the seams between members 102D and 112 and 102E and 114 when the thread has been fully inserted. In addition, as shown in FIG. 5C, the user can apply plumbers tape 103A and 103B to each threaded male end of members 102D and 102E. It is noted that adhesive, such as the cement/primer, should not be applied to the threads but the remaining adhesive left on the threads from the assembly shown in FIGS. 3A-3B can provide a sufficient bond.

Figure 6A:
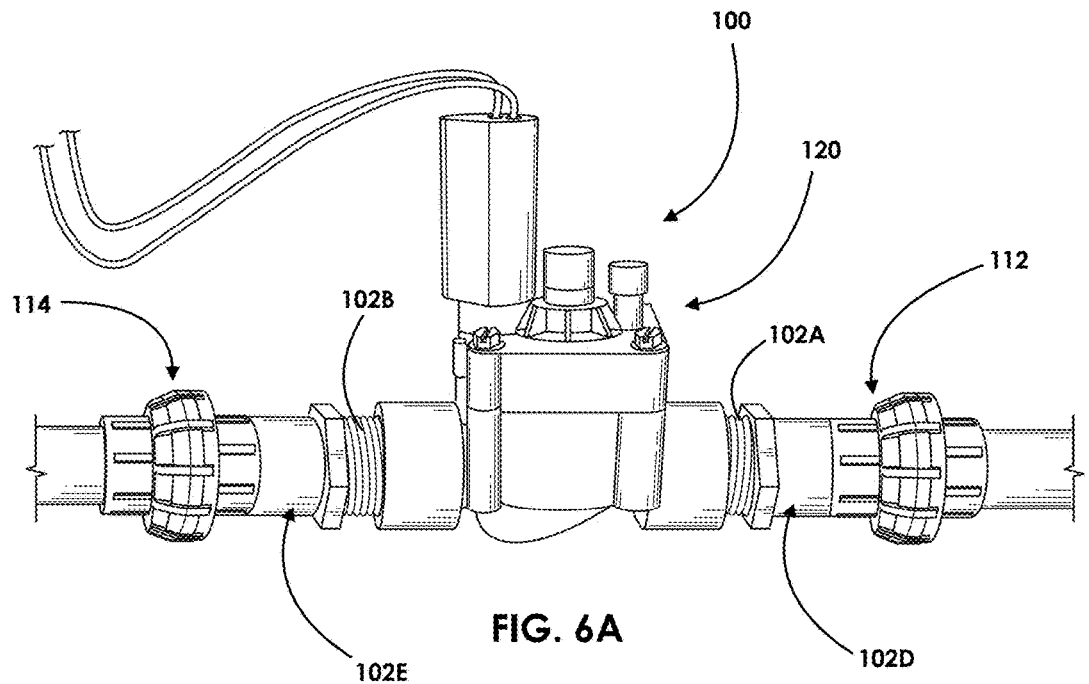
FIG. 6A illustrates a partial side view of a solenoid valve secured to and in fluid communication with the re-arranged female and slip unions and corresponding male adapters and severed riser members, shown secured to each other in assembled form, according to one non-limiting exemplary embodiment of the disclosure described herein.
Figure 6B:
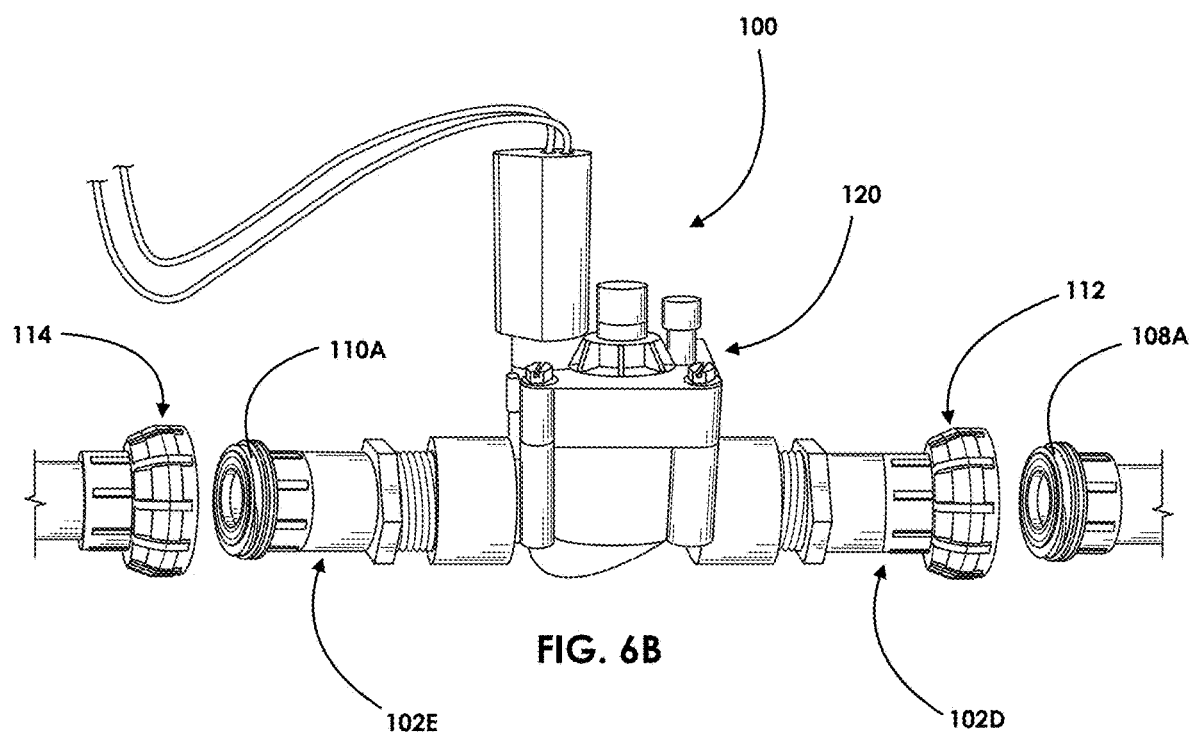
FIG. 6B illustrates a partial side view of a solenoid valve secured to and in fluid communication with the re-arranged female and slip unions and corresponding male adapters and severed riser members, shown in dis-assembled form to allow quick replacement of the solenoid valve, according to one non-limiting exemplary embodiment of the disclosure described herein.
Figure 7:
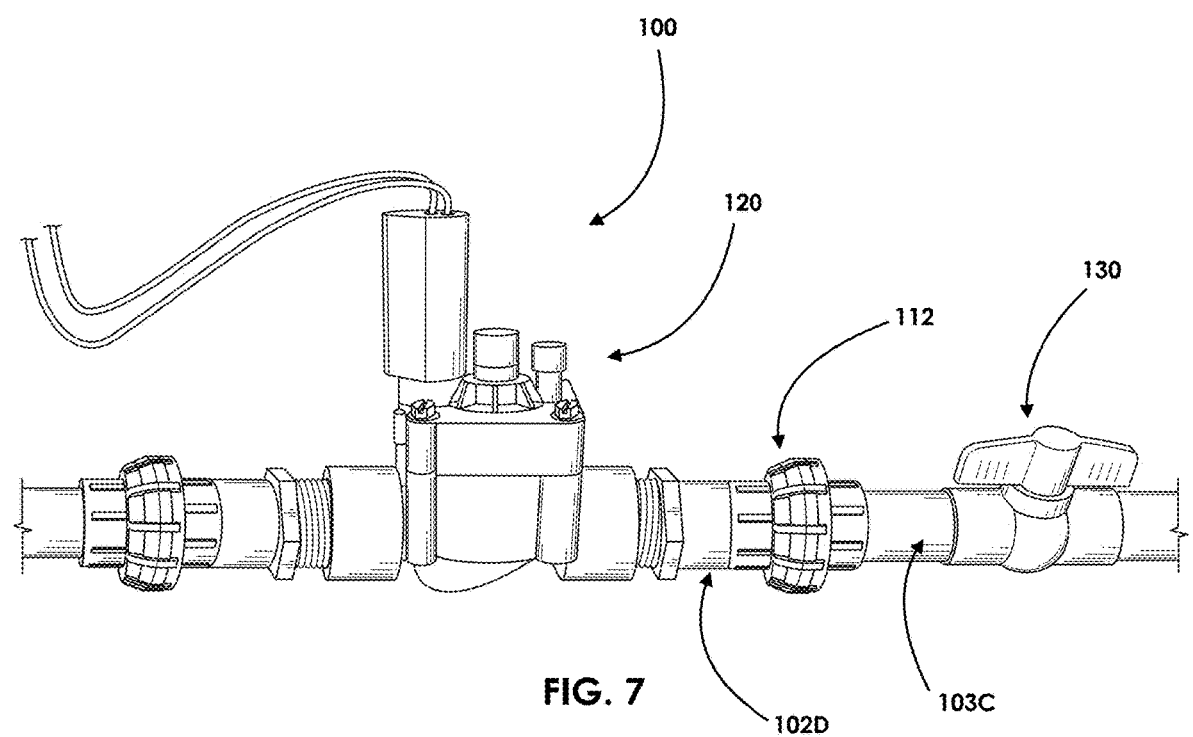
FIG. 7 illustrates a partial side view of a solenoid valve secured to and in fluid communication with the re-arranged female and slip unions and corresponding male adapters and severed riser members and further communication with a one-way or two-way shut off valve, shown secured to each other in assembled form, according to one non-limiting exemplary embodiment of the disclosure described herein.

FIGS. 6A-6B illustrate a partial sprinkler system assembly 100 showing a method of assembling and disassembling union members 112 and 114 from solenoid valve 120. Here, the threaded male members of each of member 112 and 114 can be secured to the inlet and outlet ports of the solenoid valve, such via using pliers (such as channel lock pliers) or a wrench. As shown, members 112 and 114 can be quickly attached and detached from the inlet and outlet ports of solenoid valve 120, thereby providing quick and easy replacement of the solenoid without the need to cut various types of piping and other drawbacks associated with conventional solenoid replacement, as previously discussed herein. In addition, in some embodiments, such as shown in FIG. 7, sprinkler system 100 may also include a one-way or shut-off valve or ball valve 130 integrated into the piping that is a conduit to the inlet of the solenoid valve (via members 112 and 102D). Here, any portion of piping 103C can be cut or severed in order to place the ¾" valve 130 to secure it thereto, such as using PVC cement and primer (or any adhesive) as previously discussed. Here, this can allow a user to easily shut off any water flow going into the solenoid valve in order to allow a user to unthread member 108A from member 112 without water from the main line pouring out of the open end of the piping (once detached from the solenoid), thereby further improving the process of replacing the solenoid valve 120. It is contemplated within the scope of the present disclosure described herein that any of the piping that leads into either members 112 and 114 may include a shut-off valve 130. It is noted that adhesive, such as the cement/primer, should not be applied to the threads when assembling members 112 and 114 to the solenoid valve 120.

For the initial installation of the assembled solenoid valve and the previously discussed members, the user can turn off the power to the sprinkler system and the solenoids. Next, the user can disconnect the defective solenoid valve and dig out an area for the assembly to be placed and installed and is easily accessible. Next, the user can remove the old defective solenoid and cut back the current piping to fit parts of assembly 100. Using the PVC cement, the user can attach members 102D, 102E, 112, 114, and optionally valve 130 to the removed section of piping. Here, the user can take note to properly install assembly 100 in the correct direction (for the water flow) in order for the replacement solenoid to function properly. Next, the user can then wire the new solenoid to the sprinkler system and cover it with a large irrigation control access that is large enough for replacing the solenoid valve without digging.

Figure 8:
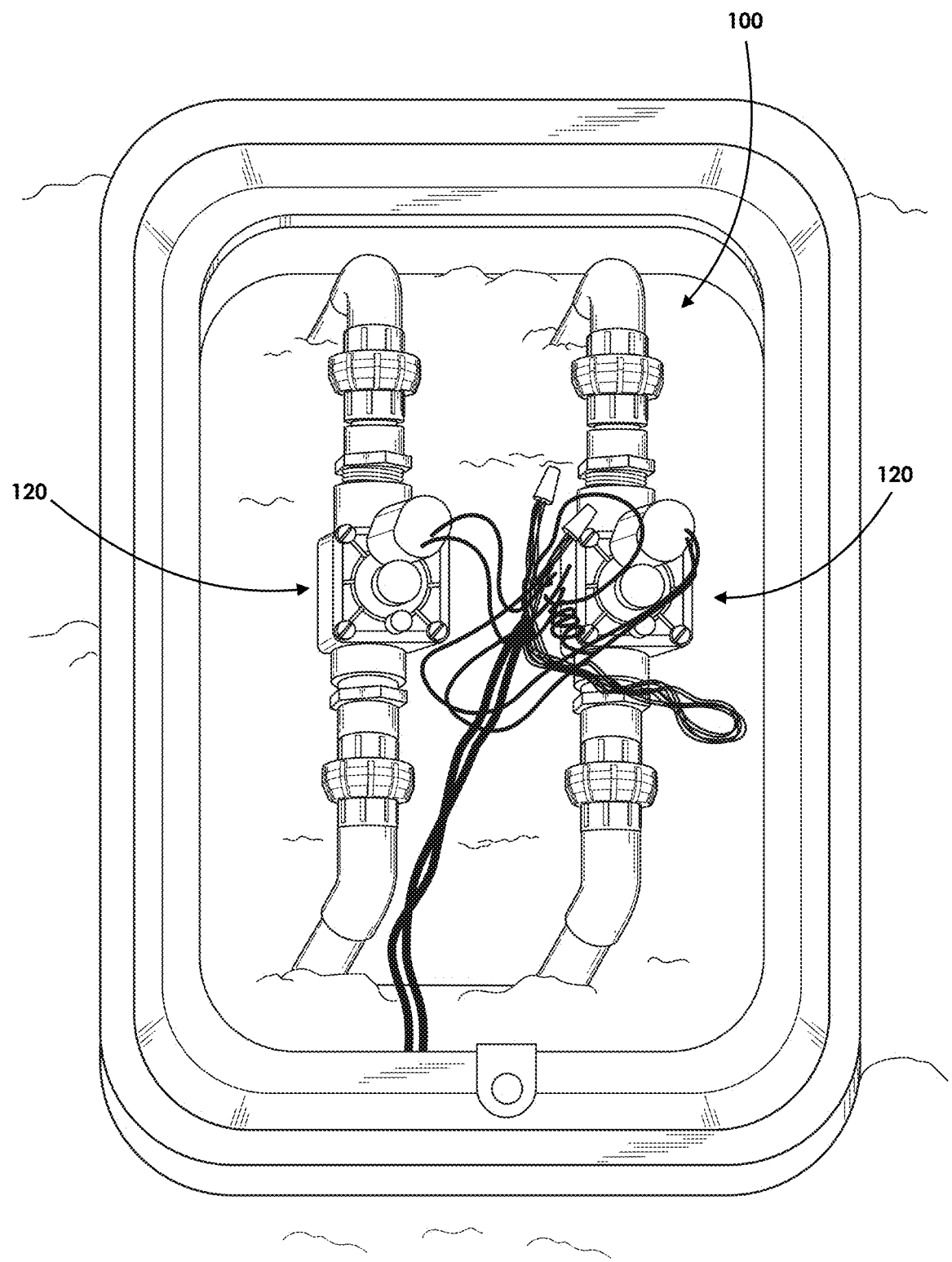
FIG. 8 illustrates a simplified top perspective view of the sprinkler assembly after replacement of the solenoid valves, as shown in the ground, according to one non-limiting exemplary embodiment of the disclosure described herein.
Figure 9:
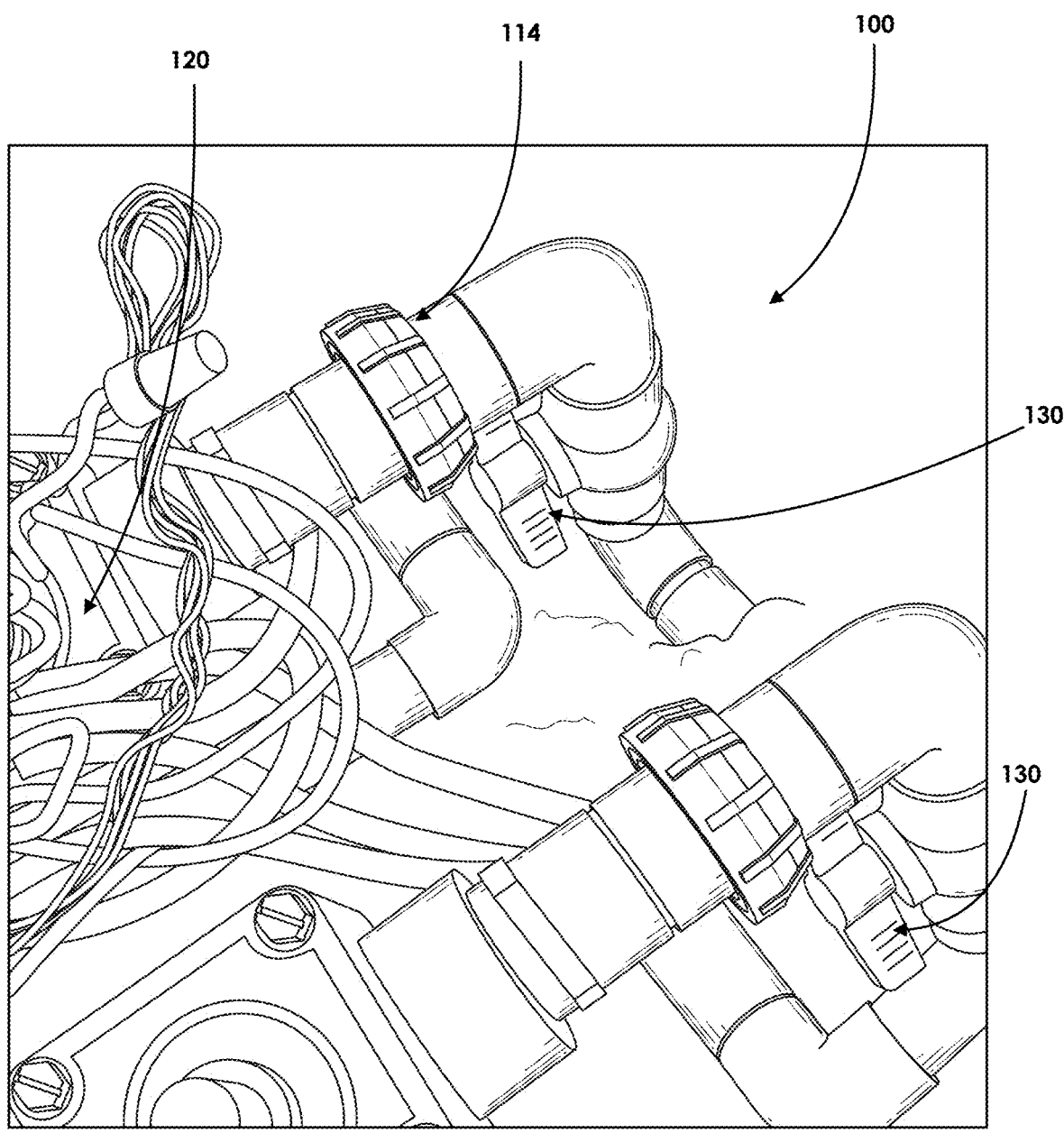
FIG. 9 illustrates a simplified close-up top perspective view of the sprinkler assembly after replacement of the solenoid valves, along with the shut-off valve, as shown in the ground, according to one non-limiting exemplary embodiment of the disclosure described herein.

The foregoing steps can make the use of channel lock wrenches easier when the system needs to be replaced. When installed, the assembly 100 can resemble that as shown in FIGS. 8 and 9, not including any elbow or other piping additions as needed. In particular, it is contemplated within the scope of the present disclosure described herein that shape and form of assembly 100 may change from system to system. As discussed, valve 130 allows for an individual section's water to be stopped during repair thereby eliminating the need for turning off water for all sections or zones. In addition, valve 130 allows for various zones to be independent shut off and the solenoid for that particular zone to be repaired while the other zones remain unaffected or operational.

FIG. 8 illustrates a simplified view for an embodiment of the sprinkler assembly system 100 of the disclosure described herein (shown in ground within a box) with the assembled components as disclosed herein, thereby allowing for quick and easy removal and replace of solenoids 120. Accordingly, the user is not required to perform any additional digging or removal of soil in order to access and remove the solenoids. FIG. 9 illustrates another embodiment of sprinkler assembly system 100 of the disclosure described herein (also shown in ground within a box) having the optional shut-off valves 130 as previously discussed herein and elbow piping configurations.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A method of assembling a solenoid valve assembly, the method comprising:
   severing a riser pipe into a first member, wherein the first member comprises a threaded male end and a non-threaded male end;
   securing a non-threaded female end of a second member to the non-threaded male end of the first member via one or more adhesives;
   securing a threaded male end of the first member to a threaded female end of a third member; and
   coupling a threaded male end of the second member to a solenoid valve inlet or outlet opening.

2. The method of claim 1, further comprising:
   securing a threaded ring member to the exterior of the third member.

3. The method of claim 1, further comprising:
   securing a fourth member to the third member via the threaded ring member.

4. The method of claim 1, wherein the one or more adhesives is comprised of at least PVC cement.

5. The method of claim 1, wherein the second member further comprises a non-threaded exterior end.

6. The method of claim 1, further comprising:
   coupling a first shut-off valve to the third member, wherein the first, second, and third members are disposed between the solenoid valve and the first shut-off valve.

7. The method of claim 1, further comprising:
   severing the riser pipe into a fifth member, wherein the fifth member comprises a threaded male end and a non-threaded male end;
   securing a non-threaded female end of a sixth member to the non-threaded male end of the fifth member via one or more adhesives;
   securing a threaded male end of the fifth member to a threaded female end of a seventh member; and
   coupling a threaded male end of the sixth member to the solenoid valve inlet or outlet opening.

8. The method of claim 7, further comprising:
   coupling a second shut-off valve to the seventh member, wherein the fifth, sixth, and seventh members are disposed between the solenoid valve and the second shut-off valve.

9. The method of claim 1, further comprising:
   measuring about one-inch distance from a base of the threaded end of the riser pipe;
   marking the about one-inch distance on the riser pipe; and
   severing the riser pipe at the marked about one-inch distance into the first member.

10. The method of claim 1, further comprising:
    connecting the third member to one or more piping of a sprinkler or irrigation assembly.

11. The method of claim 10, further comprising:
    digging a control access area into the earth; and
    placing the assembled solenoid valve, first, second, and third members inside the control access area.

12. A method of assembling a solenoid valve assembly, the method comprising:
    severing a pipe into a first member, wherein the first member comprises a threaded end and a non-threaded end;
    securing a non-threaded end of a second member to the non-threaded end of the first member via one or more adhesives;
    securing a threaded end of the first member to a threaded end of a third member; and
    coupling a threaded end of the second member to a solenoid valve inlet or outlet opening.

* * * * *